(12) United States Patent
Martin

(10) Patent No.: US 7,490,590 B1
(45) Date of Patent: Feb. 17, 2009

(54) ELECTRONIC THROTTLE

(75) Inventor: Douglas Raymond Martin, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 12/056,744

(22) Filed: Mar. 27, 2008

(51) Int. Cl.
*F02D 9/10* (2006.01)
(52) U.S. Cl. .................. 123/399; 123/397; 123/361
(58) Field of Classification Search ............... 123/361, 123/397, 399
See application file for complete search history.

(56) References Cited

U.S. PATENT DOCUMENTS

| | | | | |
|---|---|---|---|---|
| 4,951,772 A * | 8/1990 | Peter et al. ................ | 180/197 |
| 5,076,231 A * | 12/1991 | Buchl ....................... | 123/399 |
| 5,297,522 A * | 3/1994 | Buchl ....................... | 123/399 |
| 6,029,513 A * | 2/2000 | Kikori et al. ............. | 73/114.36 |
| 6,253,732 B1 * | 7/2001 | Semeyn et al. ............ | 123/396 |
| 6,286,481 B1 * | 9/2001 | Bos et al. .................. | 123/399 |

* cited by examiner

*Primary Examiner*—Erick Solis

(57) ABSTRACT

A throttle having: a housing having an airflow passage therein; a throttle plate rotatably mounted to the housing and disposed within the passage; a motor disposed outside the passage for rotating the throttle plate within the passage between an open position and a closed position in accordance with demanded torque signals; a spring coupled to the throttle plate for urging the throttle plate to a closed position in the absence of a demanded torque signal; and, an actuator assembly operative to place a stop, disposed outside the passage, in a position to limit rotation of the throttle plate to a predetermined minimum closed position in the absence of a demanded torque signal and for removing the stop when the motor receives a demanded torque signal.

3 Claims, 6 Drawing Sheets

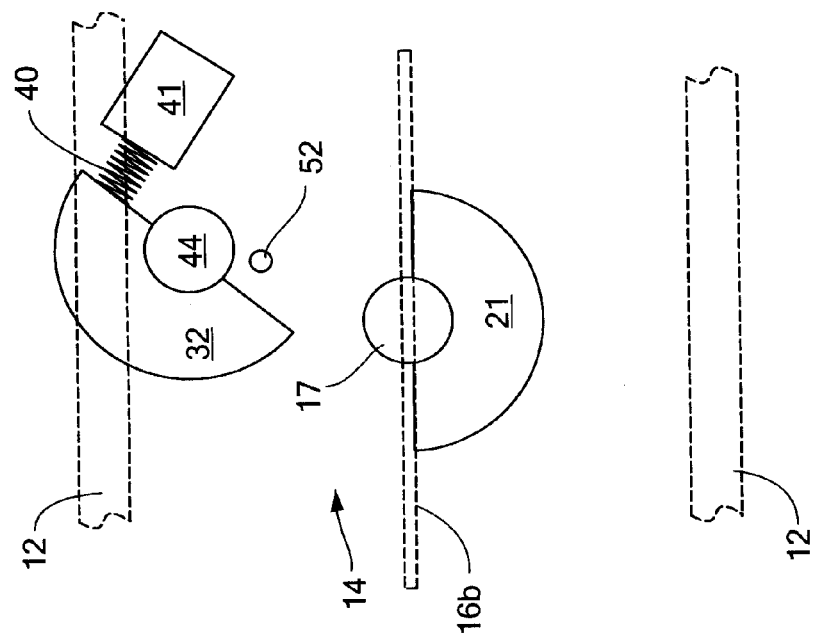
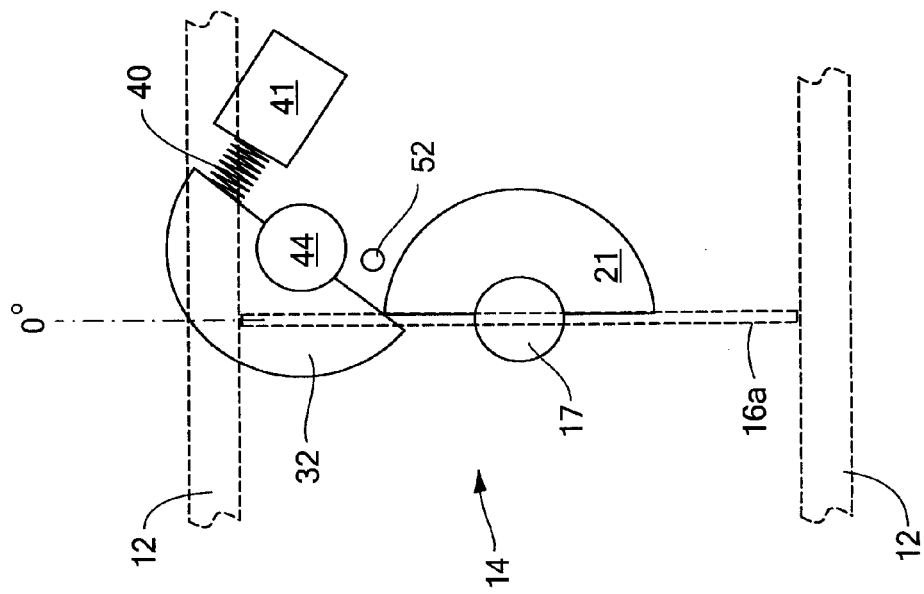

ELECTRONIC THROTTLE

TECHNICAL FIELD

This invention relates generally to electronics throttles and more particularly to electronic throttles having power-removed/fail safe positioning.

BACKGROUND

As is known in the art, electronic throttles used on motor vehicles include an electronic motor for driving a throttle plate in accordance with electrical commands generated in response to operator demanded torque manifested by operator actuation of an accelerator pedal. In one electronic throttle, the throttle includes a pair of helical springs disposed about the shaft of the throttle plate providing opposing rotational forces about the throttle plate shaft. Typically, when the motor is empowered, the throttle plate is urged by a first one of the pair of springs to a closed position while the other one of the pair of springs resists the rotational forces provided by the first one of the pair of springs and tends to rotate the throttle plate in an open position, such that when power is removed from the motor to two springs work together and maintain the throttle in a neutral position of typically 7 degrees open. Thus, the motor attempts to maintain the throttle plate in this neural position in the absence of demanded torque by the operator. In order for the motor control system to operate at this neutral position, the spring constants among other things must be taken into consideration. In many cases, the control system operation results in the throttle plate dithering about the neutral position. A throttle position sensor is used for feedback to ensure proper positioning of the throttle.

SUMMARY

In accordance with the present invention, a throttle assembly is provided comprising: a housing having an airflow passage therein; a throttle plate assembly having a throttle plate rotatably mounted to the housing and disposed within the passage; a motor disposed outside the passage for rotating the throttle plate within the passage between an open position and a closed position in accordance with demanded torque signals; a spring coupled to the throttle plate for urging the throttle plate towards a closed position in the absence of a demanded torque signal; and, an actuator assembly operative to place a stop, disposed outside the passage, in a position to limit rotation of the throttle plate to a predetermined minimum closed position in the absence of a demanded torque signal and for removing the stop when the motor receives a demanded torque signal to enable the motor to rotate the throttle plate within the passage between an open position and a closed position in accordance with the demanded torque signals.

Thus, with such an arrangement, the spring is provided to drive the throttle plate closed in the absence of demanded torque (i.e., when no control signal is supplied to the motor) but the actuator operates to place a stop to engage the throttle plate assembly so that the stop prevents the throttle plate from closing to zero degrees but rather limits the rotation of the throttle plate closing to a set non-zero angle, such as 7 degrees. When the motor receives a non-zero activation signal, the actuator removes the stop and no longer limits the rotational angle of the throttle plate.

In one embodiment, the actuator assembly includes: an electromagnet assembly comprising a fixed member stationary relative to the housing and a movable member, such moveable member being arranged to move relative to the stationary member in response to current fed to the electromagnet assembly, wherein the moveable provides the stop position in the absence of a demanded torque signal; and a spring having one end positioned to engage the moveable member and having a second end stationary relative to the housing. The spring is compressed by the moveable member when the motor receives a demanded torque signal and wherein the spring decompressed in the absence of a demanded torque signal to place the moveable member in a position to limit rotation of the throttle plate to the predetermined minimum closed position and thereby provide the stop.

In one embodiment, a throttle is provided having a throttle body having a hollow airflow passage passing therethrough. The throttle includes a shaft passing through the body transverse the passage, such shaft having an end extending outside the passage, such end being coupled to a stop engaging structure disposed outside the passage. A throttle plate is mounted to the shaft, such rod and mounted throttle plate being rotatably mounted to the body to enable the throttle plate to rotate between an open position to provide relative large airflow through the passage and a closed position to provide relative small airflow. An electric motor is disposed outside the passage and is coupled to the end of the shaft for rotating the shaft and the throttle plate connected to such shaft to rotate the throttle plate within the passage and control angular rotational position of the throttle plate within the passage between the open and closed positions to control airflow through the passage in response to a throttle plate position control signal fed to the motor. A spring is coupled to the shaft to resist the angular rotation of the motor on the shaft and urge the throttle plate toward the closed position. An electromagnetic actuator assembly is disposed outside the passage and responsive to the throttle plate position control signal for engaging the stop engaging structure to limit the rotational position of the throttle plate to a predetermined, minimum closed position within the passage in the absence of a throttle plate position control signal and for disengaging from the stop engaging structure in the presence of such throttle plate position control signal to enable the motor to rotate the shaft and the throttle plate connected to such shaft in the presence of the throttle plate position control signal between the open and closed positions.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2A is a sketch of the side view of the throttle assembly of FIG. 1A according to the invention, such sketch showing a throttle plate driven to a fully closed position by an electric motor in response to a signal fed to the motor;

FIG. 2B is a sketch of the side view of the throttle assembly of FIG. 1A according to the invention, such sketch showing a throttle plate driven to a fully opened position by an electric motor in response to a signal fed to the motor;

Like reference symbols in the various drawings indicate like elements.

DETAILED DESCRIPTION

Figure 1A:
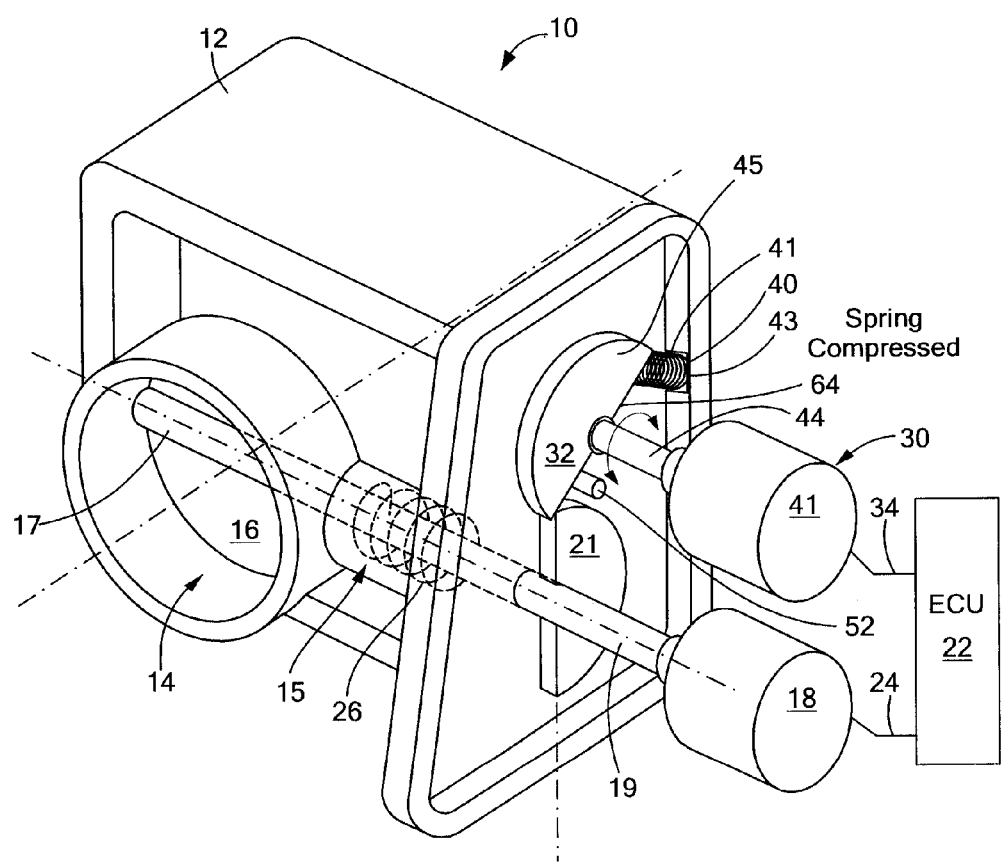
FIG. 1A is a sketch of a throttle assembly according to the invention, such sketch showing a throttle plate driven to a closed position by an electric motor in response to a signal fed to the motor.
Figure 1B:
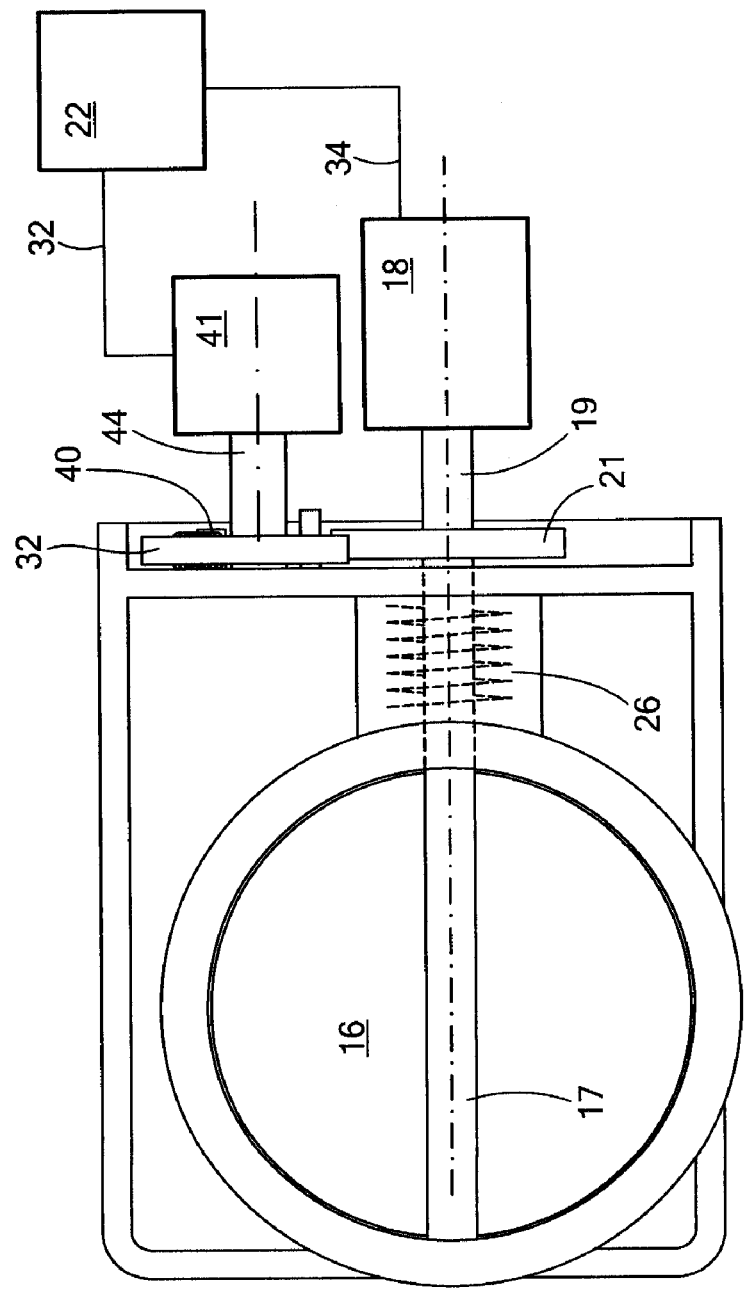
FIG. 1B is a sketch of a front view of the throttle assembly of FIG. 1A.
Figure 1C:
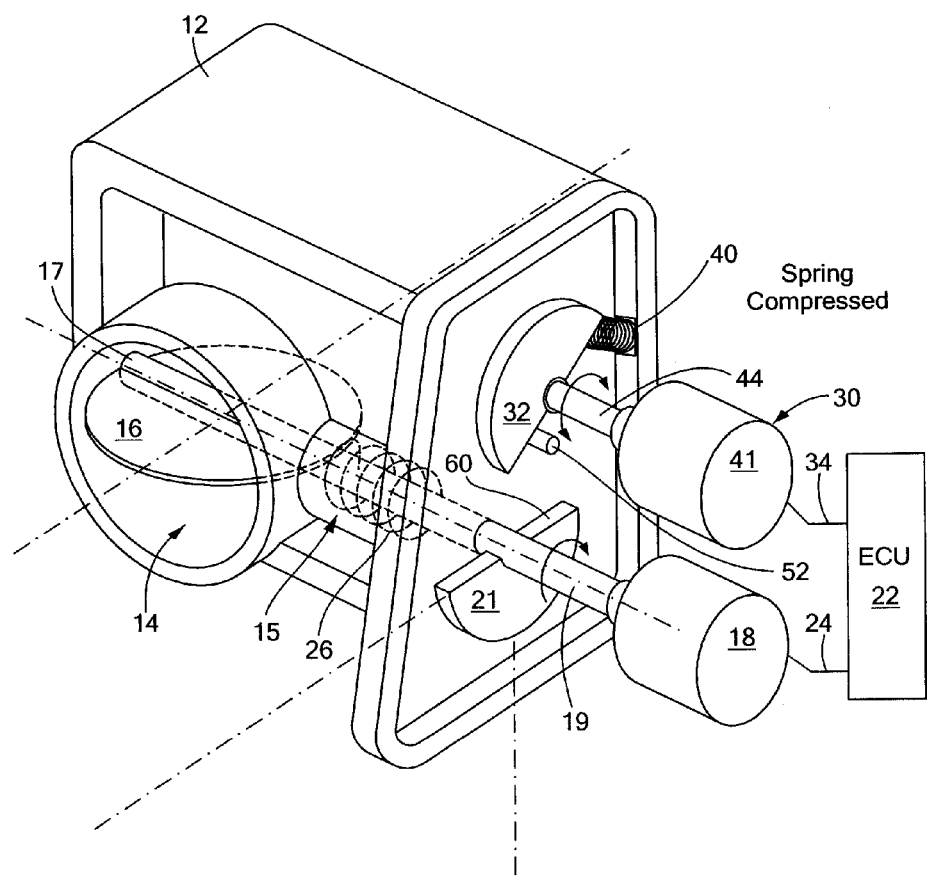
FIG. 1C is a sketch of the throttle assembly of FIG. 1A according to the invention, such sketch showing a throttle plate driven to an open position by an electric motor in response to a signal fed to the motor.
Figure 1D:
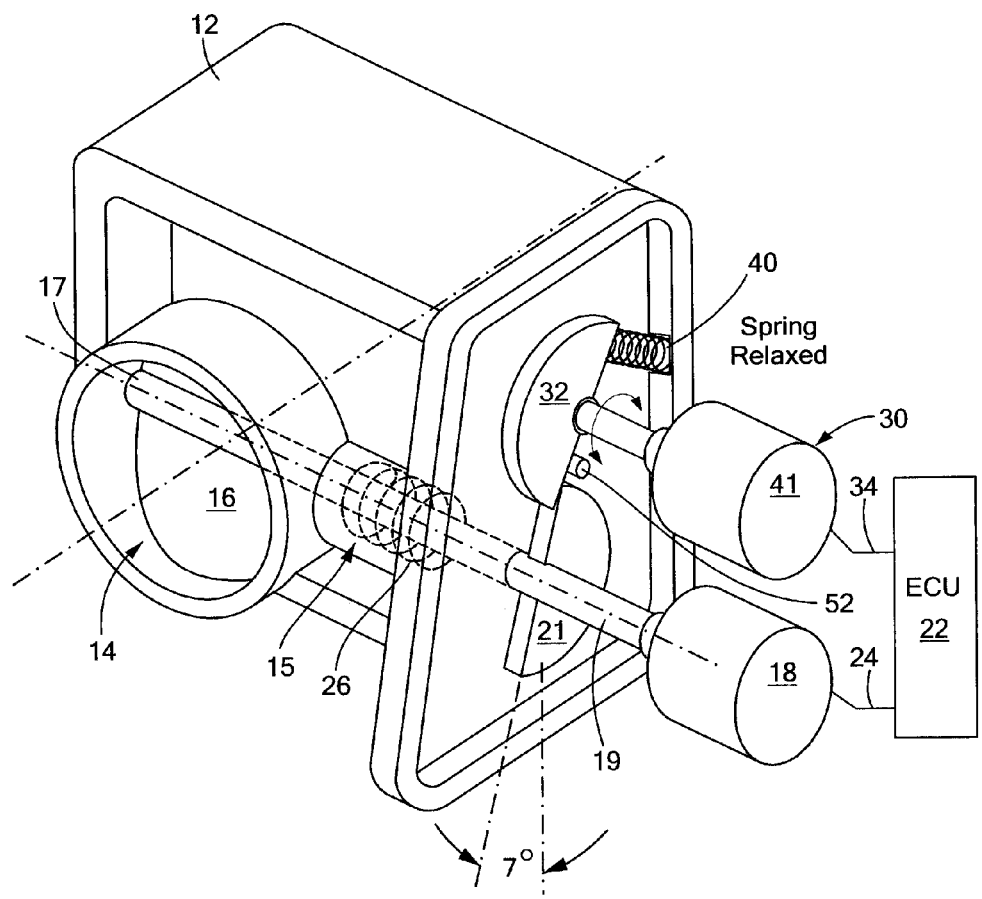
FIG. 1D is a sketch of the throttle assembly of FIG. 1A according to the invention, such sketch showing a throttle plate limited to a minimum closed position in the absence of a signal to the motor.
Figure 2D:
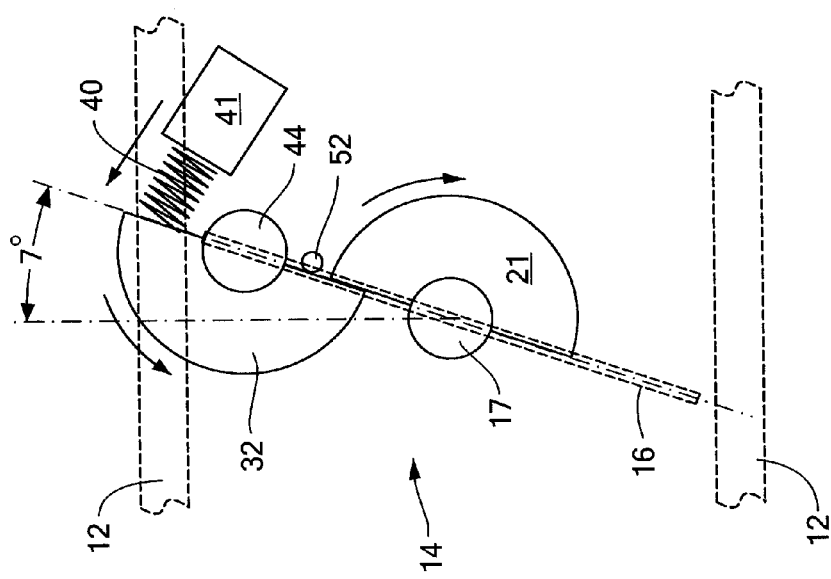
FIG. 2D is a sketch of the side view of the throttle assembly of FIG. 1A according to the invention, such sketch showing a throttle plate limited to a minimum closed position in the absence of a signal to the motor.

Referring now to FIGS. 1A, 1B, 1C and 1D, a throttle assembly 10 is shown having: a housing 12 having a hollow airflow passage 14 therein; a throttle plate assembly 15 having a throttle plate 16 rotatably mounted to the housing 12 and disposed within the passage 14; an electric motor 18 disposed outside the passage 14 for rotating the throttle plate 16 within the passage 14 between an open position, i.e., 90 degrees, as shown in FIG. 1C, and a closed position, zero degrees, as shown in FIGS. 1A and 1B and 2A, in accordance with demanded torque signals fed to the motor 18 from an engine control unit 22 on line 24; a coil spring 26 coupled to the throttle plate 16 for urging the throttle plate 16 towards the closed position in the absence of a demanded torque signal on line 24; and, an actuator assembly 30 operative to place a stop 32, disposed outside the passage 14, in a position to limit rotation of the throttle plate 16 to a predetermined minimum closed position, here for example 7 degrees, as shown in FIGS. 1D and 2D in the absence of a demanded torque signal on line 24 and in the absence of an actuation signal on line 34 from the engine control unit 22 and to remove the stop 32 when the motor 24 receives a demanded torque signal on line 24 and when the actuator assembly 30 receives an actuation signal on line 34 to enable the motor to rotate the throttle plate within the passage between the open position and the closed position in accordance with the demanded torque signals, as shown in FIGS. 1A, 1B, 1C and 1D.

More particularly, the throttle assembly 10 includes a shaft 17 passing through the housing 12 transverse the passage 14, such shaft 17 having an end 19 extending outside the passage 14, such end 19 being coupled to a stop engaging structure 21 disposed outside the passage 12. The throttle plate 16 is mounted to the shaft 17, such shaft 17 and mounted throttle plate 16 being rotatably mounted to the housing 12 to enable the throttle plate 16 to rotate between an open position to provide relative large airflow through the passage and a closed position to provide relative small airflow as described above in connection with FIGS. 1A, 1B, 1C and 1D in accordance with the demanded torque signals fed to the motor 18 when there is a signal on line 34 for the actuator assembly 30.

As noted above, the electric motor 18 is disposed outside the passage 14 and is coupled to the end 19 of the shaft 17 for rotating the shaft 17 and the throttle plate 16 connected to such shaft 17 to rotate the throttle plate 16 within the passage 14 and control angular rotational position of the throttle plate 16 within the passage 14 between the open and closed positions to control airflow through the passage in response to a throttle plate position control signal fed to the motor 18 on line 24.

The spring 15 is coupled to the shaft 17 and the housing 12 to resist the angular rotation of the motor on the shaft 17 and urge the throttle plate 16 toward the closed position.

More particularly, the actuator electromagnet assembly 30 comprising a fixed member 41 stationary relative to the housing 12 and a movable member, here a shaft 44 connected to a semi-circular disc-like member 45 providing the stop 32. The moveable member 44 is arranged to move relative to the stationary member 31 in response to current fed to the electromagnet assembly 30 on line 34, wherein the moveable member 45 provides the stop position in the absence of a demanded torque signal and, more particularly, in the absence of an actuation signal on line 34. The actuator assembly 30 includes the spring 40 having one end 41 positioned to engage the moveable member 45 and having a second end 43 stationary relative to the housing 12. The spring 40 is compressed by the moveable member 45 being rotated clockwise in response to current fed to the actuator assembly 30 via line 34 and when the motor 18 receives a demanded torque signal wherein the spring 40 is decompressed in the absence of a demanded torque signal and, more particularly, in the absence of an actuation signal on line 34, to thereby rotate the moveable member 45 clockwise until hitting stop 52 fixed to the housing 12.

In the absence of a signal on line 24 to the motor 18, the spring 15 urges the disk-like member 21 (which is connected to the shaft 17 affixed to the throttle plate 61), counter clockwise so that the surface 60 of disk-like member 21 engages the surface 64 of moveable member 45 and thereby limits the counter clockwise rotation of the throttle plate 16 to the predetermined minimums closed angular position, here 7 degrees as shown in FIGS. 1D and 2B. That is, the position of the stop 52 is disposed at a position to limit the moveable member 45 rotation so that the throttle plate 16 is at the predetermined minimum closed position.

Figure 2C:
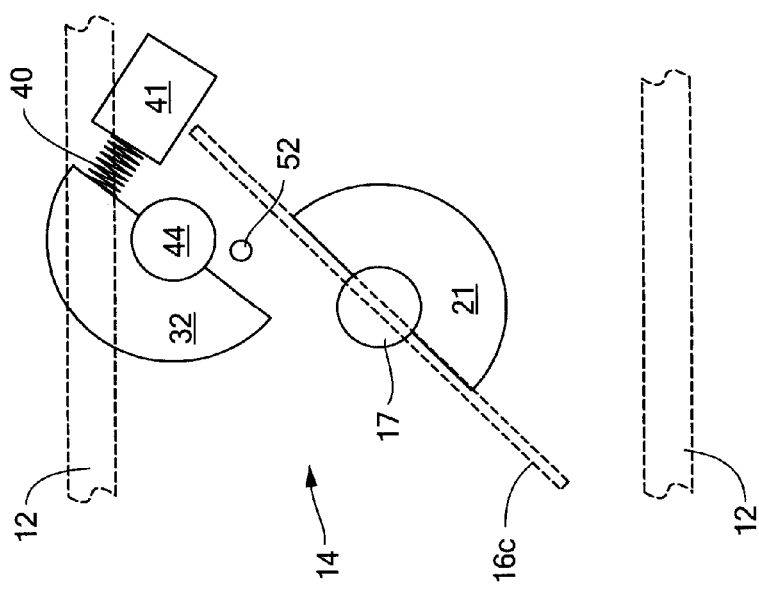
FIG. 2C is a sketch of the side view of the throttle assembly of FIG. 1A according to the invention, such sketch showing a throttle plate driven to position between a closed position and an open by an electric motor in response to a signal fed to the motor.

Thus, the actuator assembly 30 is here an electromagnetic actuator assembly disposed outside the passage 14. In the absence of an electric signal or current fed to a rotational actuator 41 from the engine control unit 22 on line 34 the actuator assembly results engages the stop engaging structure 31 to limit the rotational position of the throttle plate to a predetermined, minimum closed position within the passage in the absence of the throttle plate position control signal on line 24, and more particularly, in the absence of an actuation signal on line 34, and, in the presence of the throttle plate position control signal on line 24, and more particularly, in the presence of the actuation signal on line 34, disengaging from the stop engaging structure 21 to enable the motor to rotate the shaft and the throttle plate connected to such shaft 17 in accordance with the demanded torque signals fed to the motor 18. Thus, in the presence of the throttle plate position control signal on line 24, and more particularly, in the presence of the actuation signal on line 34. FIG. 2B is a sketch of the side view of the throttle assembly of FIG. 1A according to the invention, such sketch showing a throttle plate driven to a fully opened position by an electric motor in response to a signal fed to the motor. FIG. 2C is a sketch of the side view of the throttle assembly of FIG. 1A according to the invention, such sketch showing a throttle plate driven to position between a closed position and an open by an electric motor in response to a signal fed to the motor, Thus, with such an arrangement, when no control signal is supplied to the motor 18 and when there is no signal to the actuator 30, the stop 52 is positioned to engage the throttle plate assembly 15 so that the stop 52 prevents the plate 16 from closing to zero degrees and limits the rotation of the throttle plate 16 closing to a set non-zero angle, such as 7 degrees. When the motor 18 and the actuator assembly 30 receive electrical signals, i.e., a non-zero activation signal), the actuator assembly 30 removes the stop 52 and no longer limits the rotational angle of the throttle plate 16 which rotates under control of the electric motor 18.

A number of embodiments of the invention have been described. Nevertheless, it will be understood that various modifications may be made without departing from the spirit and scope of the invention. For example, while a rotary actuator assembly is shown, linear actuator assemblies, such as with a linear electromagnet may be used to engage a spring 40. Accordingly, other embodiments are within the scope of the following claims.

What is claimed is:

1. A throttle assembly comprising:
   a housing having an airflow passage therein;
   a throttle plate rotatably mounted to the housing and disposed within the passage;
   a motor disposed outside the passage for rotating the throttle plate within the passage between an open position and a closed position in accordance with demanded torque signals;
   a spring coupled to the throttle plate for urging the throttle plate towards a closed position in the absence of the demanded torque signal;
   an actuator assembly operative to place a stop, disposed outside the passage, in a position to limit rotation of the throttle plate to a predetermined minimum closed position in the absence of an actuator assembly signal and for removing the stop when the motor receives the demanded torque signal to enable the throttle plate to rotate within the passage between the open position and the closed position in accordance with the demanded torque signals.

2. The throttle assembly recited in claim 1 wherein the actuator assembly includes:
   an electromagnet assembly comprising a fixed member stationary relative to the housing and a movable member, such moveable member being arranged to move relative to the stationary member in response to the actuator assembly signal fed to the electromagnet assembly, wherein the moveable member provides the stop position in the absence of the actuator assembly signal; and
   a second spring having one end positioned to engage the moveable member and having a second end stationary relative to the housing;
   wherein the second spring is compressed by the moveable member when the actuator assembly receives the actuator assembly signal and wherein the spring is decompressed in the absence of the actuator assembly signal to place the moveable member in a position to limit rotation of the throttle plate to the predetermined minimum closed position and thereby provide the stop.

3. A throttle assembly, comprising:
   a throttle body having a hollow airflow passage passing therethrough;
   a shaft passing through the body transverse the passage, such shaft having an end extending outside the passage, such end being coupled to a stop engaging structure disposed outside the passage;
   a throttle plate mounted to the shaft, such shift and mounted throttle plate being rotatably mounted to the body to enable the throttle plate to rotate between an open position to provide relative large airflow through the passage and a closed position to provide relative small airflow through the passage;
   an electric motor disposed outside the passage and coupled to the end of the shaft for rotating the shaft and the throttle plate connected to such shaft within the passage and control angular rotational position of the throttle plate within the passage between the open and closed positions to control airflow through the passage in response to a throttle plate position control signal fed to the motor;
   a spring coupled to the shaft to resist the angular rotation of the motor on the shaft and urge the throttle plate toward the closed position;
   an electromagnetic actuator assembly disposed outside the passage and responsive to a actuator assembly signal for engaging the stop engaging structure to limit the rotational position of the throttle plate to a predetermined, minimum closed position within the passage in the absence of the actuator assembly signal and for disengaging from the stop engaging structure in the presence of such actuator assembly signal to enable the motor to rotate the shaft and the throttle plate connected to such shaft in the presence of the actuator assembly signal between the open and closed positions in accordance with the throttle plate position control signal fed to the motor.

* * * * *